Nov. 15, 1966
T. G. BOGLE
3,285,059
ULTRASONIC TESTING APPARATUS
Original Filed July 5, 1962
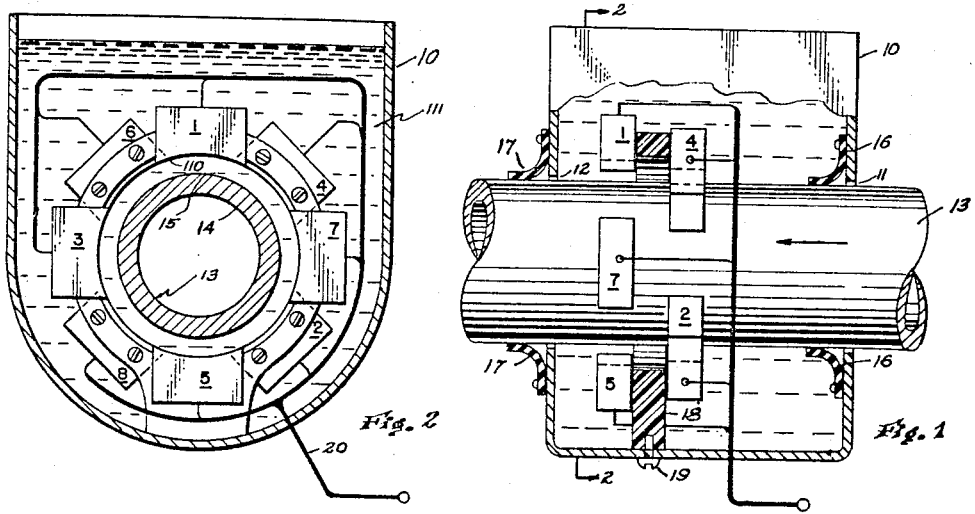
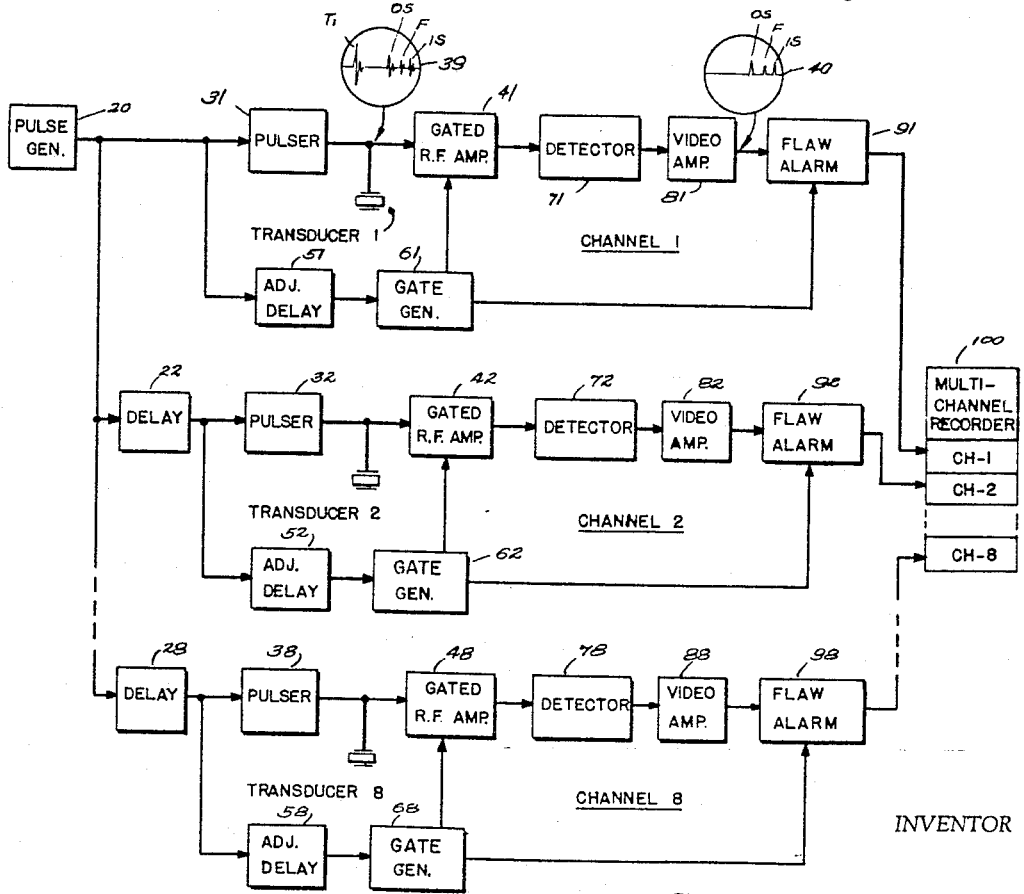
INVENTOR
TOMMY G. BOGLE
BY Arnold & Roylance
ATTORNEY United States Patent Office 3,285,059
Patented Nov. 15, 1966

3,285,059
ULTRASONIC TESTING APPARATUS
Tommy G. Bogle, Houston, Tex., assignor, by mesne assignments, to American Machine & Foundry Company, New York, N.Y., a corporation of New Jersey
Continuation of application Ser. No. 207,588, July 5, 1962. This application Oct. 21, 1965, Ser. No. 506,434
11 Claims. (Cl. 73—67.9)

This application is a continuation of prior application Serial No. 207,588, filed July 5, 1962 and entitled, "Ultrasonic Testing Apparatus," now abandoned.

This invention relates to apparatus for inspecting metallic members, and more particularly to ultrasonic inspection apparatus for locating flaws within drill pipe or other similar members.

In the oil industry, as elsewhere, the inspection of pipe and similar members to detect hidden flaws is of substantial importance. If it were not for this inspection, the flaws could cause breakage during use, resulting in substantial and sometimes irreparable damage. In recent years ultrasonic inspection techniques have been developed where an acoustic energy pulse is transmitted into the member being inspected so that the time sequence of reflected energy pulses indicate the location of flaws, if any are present.

The development of ultrasonic inspection apparatus has been hindered by the inherent slow operating speeds of the apparatus. The area which can be inspected by a single transmitted acoustic pulse is limited by practical considerations. The time interval between successive transmitted pulses, and hence the time between successive inspections, must be sufficient to permit dissipation of energy from the previous pulse. Thus, if it is desirable to inspect a tubular member in entirety, as is often accomplished by rotating the testing apparatus with respect to the tubular member while the member advances axially, the minimum inspecting time is determined by the area which can be inspected by a single acoustic pulse, and the time required to dissipate the pulse energy. Alternatively, the ultrasonic inspection can be accomplished without rotating the tubular member by successive transmission of acoustic pulses around the surface of a stationary tubular member, such as with the apparatus described in U.S. Patent 3,021,706, E. G. Cook et al. as inventors, issued February 20, 1962. The inspection time is still limited by the time required to dissipate the pulse energy.

The minimum inspection time required by ultrasonic inspection apparatus in the past has been quite long compared to that of other types of inspection apparatus.

It is an object of this invention to provide ultrasonic inspection apparatus for rapidly inspecting a metallic member in its entirety by employing a plurality of properly disposed transducers.

Another object is to provide ultrasonic testing apparatus for inspecting tubular members in entirety while requiring no relative rotation between the testing apparatus and the inspected member.

It is a further object to provide ultrasonic testing apparatus in which ultrasonic transducers are energized in a particular sequential fashion providing minimum interference between successive inspections and minimum time for the entire inspection.

In accordance with these objects, apparatus is provided including several groups of ultrasonic transducers, each group in turn including several transducers. The transducers are of the type which, when energized, transmit a pulse of acoustic energy into the member, and which subsequently receive the reflected energy pulses for reconversion into electrical pulse signals. The transducers are disposed around a member for complete coverage of a given area and are energized sequentially so that the transducer energized is the one least susceptible to interfering reflected energy from the previously energizing pulse applied to the same group, and so that a transducer in another group is energized before another transducer is energized in the same group. With this arrangement, the maximum area around the member can be covered in a minimum time without requiring relative rotation.

The output from each transducer is amplified in a separate output circuit. The amplifier portion of the output circuit is so gated that the only electrical pulse which can be amplified are those forming the group of time sequential electrical pulses corresponding to reflected energy from the outer surface of the tube, the inner surface of the tube and the flaw therebetween. Thus, the transducer energizing pulse, as well as subsequent signals from stray reflected energy pulses, are blocked and not amplified. The output also includes a flaw alarm circuit arranged to respond only to flaw signals.

Apparatus constructed in view of the stated and other objects of this invention are described in a greater detail with reference to the drawings which form a part of this specification and in which
FIG. 1 is a cutaway side view of the apparatus;
FIG. 2 is a cross section view taken at the plane 2—2, as indicated in FIG. 1; and
FIG. 3 is a block diagram indicating the control circuitry for the apparatus.

Referring to the drawings, and first to FIGS. 1 and 2, it is seen that the inspection apparatus is enclosed within a tank 10 of any suitable configuration having apertures 11 and 12 on opposite sides thereof. The tank is filled with a suitable liquid acoustic coupling medium 111, such as water. A tubular member 13, which is being inspected, has an inner surface 14, and an outer surface 15, and passes through apertures 11 and 12 in the direction indicated, i.e., from right to left as viewed in FIG. 1. Annular rubber seal members 16 and 17 are secured to the tank 10 by any suitable means so as to surround apertures 11 and 12, respectively. The seals 16 and 17 are employed to prevent the escape of liquid 111 from the tank as the tubular member 113 passes through the apertures.

Mounted within the tank 10 is an ultrasonic transducer 1, preferably of the type containing a piezoelectric crystal for use as a transmitter and receiver of acoustic energy. More specifically, when the piezoelectric crystal in transducer 1 is energized by a pulse of electrical energy, the lower curved surface 110 of the transducer vibrates for several cycles, generating a compression wave in the coupling medium or, in other words, an acoustic energy pulse is generated. The curvature of the curved surface 110 has a radius equal to the distance from the longitudinal axis of the tubular member 13. The acoustic energy pulse provided by the curved surface 110 of transducer 1 has a curved wave front which travels through the coupling medium 111 and a section of the tubular member toward the longitudinal axis of the tubular member 13. When the wave front of this acoustic energy pulse strikes the outer surface 15 and inner surface 14 of the tubular member, a portion of the energy is reflected back to the transducer 1 wherein the piezoelectric crystal reconverts this acoustic energy into an electrical output pulse. Also, if a flaw exists between the inner and outer surfaces, acoustic energy will similarly be reflected from the flaw. Accordingly, transducer 1 provides a group of time sequenced electrical output signals having a time orientation depending upon the distance of the corresponding reflecting surface from the curved surface 110 of transducer 1.

The acoustic energy pulse from transducer 1 is dispersed in a number of directions, including the reflected path back to transducer 1. Since the acoustic energy pulse travels in the same manner as light, the angle of reflection of a beam of acoustic energy is equal to the angle of incidence. Thus, configuration and alignment of transducer surface 110 controls the angle of reflection and substantial acoustic energy can be dispersed to the sides of transducer 1—circumferentially around tubular member 13. The acoustic energy pulse can also be dispersed by a rough surface on the tubular member 13. The dispersion will normally be in all directions and of a much lesser extent than the side reflections due to transducer surface configuration and alignment. A third cause of dispersion is the mode conversion set up in tubular member 13 that produces an energy wave that travels within the tubular member 13 and has a high energy transfer to liquid medium 111 at the opposite side of the tubular member 13 from the transducer that initiated the acoustic energy pulse.

Transducers 3, 5 and 7 are essentially the same in construction and operation as transducer 1. Transducer 5 is vertically disposed diametrically opposite transducer 1. Transducers 3 and 7 are diametrically opposite one another and are horizontally disposed. Transducers 1, 3, 5 and 7 are in a plane perpendicular to the longitudinal axis of tubular member 13, as shown in FIG. 1. Transducers 2, 4, 6 and 8 are also essentially similar in operation and construction to transducer 1, and are disposed in a separate plane perpendicular to the longitudinal axis of tubular member 13. Transducers 2, 4, 6 and 8 are diagonally disposed and are effectively interposed between transducers 1, 3, 5 and 7 with a slight overlap when viewed from the end of the apparatus, as shown in FIG. 2. The eight transducers are so disposed that they completely surround the tubular member being inspected to provide 360° inspection coverage.

Transducers 1–8 are attached to a retaining member 18 to maintain the transducers in their appropriate respective positions. Retaining member 18 can be of any suitable configuration, and is preferably constructed from a plastic material and secured to the tank 10 by means of some securing means such as screw 19. Each of these transducers is separately connected via separate conductors forming the cable 9 to a control unit, shown in FIG. 3, to be described hereinafter in greater detail. The control unit, as shown in FIG. 3 also includes eight separate output channels, each connected to a different one of the transducers and operative for a short time interval following the energization of the associated transducer to thus be responsive only to meaningful electrical pulses as developed by the transducer, i.e., those electrical pulses corresponding to reflections from the inner surface, the outer surface, and flaws immediately adjacent the transducer.

As mentioned previously, the acoustic energy produced by a transducer is not completely dissipated when passing through the portion of the tubular member immediately adjacent the transducer. The other transducers in the same group, and particularly the diametrically opposite transducer, therefore receive substantial quantities of acoustic energy and in response thereto provide meaningless output signals.

A second transducer in the same group cannot be energized until the acoustic vibrations from the previous pulse have dissipated sufficiently so that the meaningless signals will not interfere with the meaningful signals caused by the succeeding acoustic pulses. For transducers not diametrically opposite, the meaningless signals diminish below the harmful level more rapidly. A group of transducers can therefore be energized sequentially more rapidly if the diametrically opposite transducers are not energized successively and therefore transducers of the first group are energized in the sequence of transducers 1–3–5–7–1 . . ., etc. Transducers in the other group are similarly energized in the sequence of transducers 2–4–6–8–2 . . ., etc. The diametrically opposite transducers can be energized simultaneously without having harmful interference with the meaningful signals. A group of transducers can therefore be energized sequentially most rapidly if the diametrically opposite transducers of the first group are energized in the sequence 1 and 5, 3 and 7, . . ., etc. Transducers in the other group are similarly energized in the sequence of transducers 2 and 6, 4 and 8 . . ., etc.

Providing that the spacing between the two groups of transducers is sufficient, there will be little interference between the groups. It is therefore possible to energize the eight transducers in the two groups sequentially within the same period of time required to energize four transducers sequentially in a single group. Thus, the required inspection time is cut in half by energizing the eight transducers in the sequence 1–2–3–4–5–6–7–8–1 . . ., etc., or 1 and 5, 2 and 6, 3 and 7, 4 and 8, . . . etc., if opposite transducers are energized simultaneously. It is obvious that the time required for inspection of a tubular member could be decreased still further by dividing the number of transducers into more groups and similarly energizing transducers within the separate groups sequentially.

The control unit is illustrated in block form in FIG. 3, and includes a pulse energizing section which energizes the transducers sequentially, and separate output circuits for each of the transducers to amplify the output signals therefrom and display these signals on a multi-channel recorder. Since the circuits associated with the transducers are all essentially the same, only circuits for transducers 1, 2 and 8, and corresponding output circuit channels 1, 2 and 8 are shown.

A pulse generator 20 is in the transducer energizing section and provides regularly spaced recurring timing pulses. The output pulse from pulse generator 20 is supplied directly to a thyratron pulser circuit 31. The same pulse from the pulse generator is applied to other thyratron pulsers 32–38 through associated time delay circuits 22–28, the time delay circuits being so adjusted to form a distributor which sequentially applies the output pulse from pulse generator 20 to the thyratron pulser circuits. Thus, thyratron pulser circuit 31 immediately receives the timing pulse from the pulse generator, thyratron pulser circuit 32 receives the same pulse a short time later, and subsequently the thyratron pulser circuits associated with transducers 3, 4, 5, 6, 7 and 8 successively receive the timing pulse. The next successive pulse from pulse generator 25 is provided after the previous pulse has been distributed to all thyratron pulser circuits.

The thyratron pulsers 31–38 are connected directly to the transducers 1–8 and provide, to the transducer, a high energy electrical pulse containing a substantial harmonic content at the resonant frequency of the transducer. Accordingly, when the thyratron pulser is turned on in response to a received timing pulse, a high energy pulse is applied to the transducer, causing it to vibrate at its fundamental frequency to provide an acoustic energy pulse.

When opposite transducers in one group are to be energized simultaneously, separate output circuits can be used for these transducers and the delay time made equal for energizing the respective thyratron pulsers.

The output circuit, which operates in response to the electrical signals provided by the transducer, must be connected to the transducer. The output circuit therefore receives a portion of the energizing pulse applied to the transducer by the associated thyratron pulser circuit. For best operation of the output circuit, it is desirable that only a certain group of the transducer electrical output signals be amplified, and that other signals, such as the transducer energizing pulse and electrical signals provided by the transducer in response to meaningless reflected vibration pulses, be blocked.

The output circuit in channel 1 includes a gated radio frequency amplifier 41 which is connected directly to the transducer 1. Gated amplifier 41 receives the main energizing pulse identified as $T_1$ and illustrated in waveform 39, and electrical pulses OS, IS and F developed by the transducer in response to reflected acoustic energy respectively from the outer surface of the tubular member, the inner surface of the tubular member, and a flaw between the outer surface and the inner surface. Also applied to gated R.F. amplifier 41 are electrical signals corresponding to meaningless reflections of acoustic energy which may occur until the acoustic energy is completely dissipated. An electrical gate circuit at the input of the R.F. amplifier is opened shortly after the main energizing pulse $T_1$ has been amplified, and is closed shortly after the IS pulse should have occurred, and in this manner the $T_1$ pulse and meaningless electrical pulses are blocked and not amplified.

An adjustable delay circuit 51 is connected to receive the timing pulse applied to thyratron pulse circuit 31 and delivers this timing pulse to gate generator 61 after a short time delay. The time delay is so adjusted that the pulse applied to gate generator 61 occurs after transducer 1 has stopped vibrating as a result of the energizing pulse supplied via thyratron pulser circuit 31. Gate generator 61 operates in response to the pulse received from delay circuit 51 to open the electronic gate in gated amplifier 41, and maintains this gate in the open condition for a time period thereafter sufficient to permit the meaningful group of electrical pulses from transducer 41 to pass through and be amplified.

The OS, IS and F pulses developed by transducer 1 are radio frequency pulses at the resonant frequency of the piezoelectric crystal within the transducer. These high frequency pulses are amplified by the gated R.F. amplifier 41, and are subsequently passed through detector 71 to remove the high frequency components from the signal. After detection, the pulses are amplified in video amplifier 81. The output from video amplifier 81 is shown by waveform 40.

Output circuit channel 1 has a flaw alarm circuit 91, connected to the output of the video amplifier 81. The flaw alarm circuit 91 is conventional equipment in the flaw inspection art and functions to respond only to signals occurring during the time a flaw signal appears. A suitable arrangement is to employ a gate that is opened after the outside surface signal has been received in response to a delayed output of gate generator 61 and closed before the inside surface signal is received. The flaw alarm circuit 91 permits only the flaw signals to pass to a recording channel 1 on multi-channel recorder 100.

The remaining channels in the control unit include the gated R.F. amplifiers 42–48 operated in response to the signal developed by adjustable delay circuits 52–58 and gate generator circuits 62–68. It should be noted that the input to the adjustable delay circuits 52–58 is taken from the input to the associated thyratron pulser circuits 32–38, and that therefore the associated gated R.F. amplifiers 42–48 are operative in response to the desired group of electrical signals from the associated transducer. The output signals from the gated R.F. amplifiers 42–48 are detected in detector circuits 72–78, are amplified in video amplifier circuits 82–88, and are coupled to flaw alarm circuits 92–98 for recording the flaw signals on multi-channel recorder 100. These circuits in channels 2–8 are essentially the same and operate in essentially the same manner as those previously described with respect to channel 1. The outputs from the video amplifier circuits 82–88 are connected to channels 2–8, respectively, of a multi-channel recorder 100. Other types of indicators, recorders, and output devices may be employed to receive the electrical pulses from the video amplifiers and process the electrical pulses in a preferred way.

While only a single embodiment of the invention has been described, it is obvious that numerous changes can be made without departing from the scope of the invention. For example, the transducers could be disposed in any number of separate planes perpendicular to the longitudinal axis of the member being inspected to provide complete inspection coverage over a given area and then energized in a sequence such that a transducer in each group is energized before a second transducer in the same group is energized. Also, this invention is not limited to the inspection of tubular goods as it is obvious that the inspection apparatus can be adapted to inspect nontubular goods.

What is claimed is:
1. In ultrasonic inspection apparatus for examining the interior of a hollow member, the combination comprising
   a plurality of acoustical energy transducers positioned substantially in a plane and juxtaposed to at least partially surround the member being inspected, at least two of said transducers being disposed facing each other on opposite sides of the member and a third transducer intermediately disposed between said two transducers, each of said transducers being operative
      to transmit an acoustic energy pulse into the member substantially normally to its outer surface when said each transducer is electrically energized, and
      to provide an electrical output signal in response to reflected acoustic energy pulses received from the member;
   pulse generating means for energizing said plurality of transducers,
      said oppositely disposed transducers being energized simultaneously and said intermediate transducer being subsequently energized after a time sufficient to preclude any substantial interference of reflected acoustic energy from a previously applied energizing pulse;
   separate output circuit means connected each to a different transducer; and
   separate gating means connected between said pulse generating means and said output circuit means connected to each transducer,
      whereby each of said gating means conditions each of said output circuit means to be responsive to electrical signals derived from reflections of acoustic energy caused by the echoes from previous energization of the associated one of said transducers connected thereto.
2. An ultrasonic testing apparatus in accordance with claim 1 wherein a liquid acoustical coupling medium extends between said acoustic transducers and the said tubular member.
3. In ultrasonic inspection apparatus suitable for examining the interior of a tubular member, the combination comprising
   a plurality of acoustic transducers so spaced with respect to each other as to permit acoustic energy coverage circumferentially of a surface of a member to be inspected substantially normally to said surface, at least two of said transducers being spaced apart longitudinally of said member such that interference between the acoustic energy emanating from one of said two transducers upon energization thereof and acoustic energy emanating from the other of said two transducers upon energization thereof is minimized,
   electrical pulse generating means for so energizing said transducers sequentially that interference between the acoustic energy emanating from one transducer upon energization thereof and acoustic energy emanating from another transducer upon energization thereof is minimized; and
   separate circuit means connected each to a different transducer and responsive only to electrical signals derived from reflections of acoustic energy previously transmitted from the connected transducer upon energization.

4. An ultrasonic inspection apparatus in accordance with claim 3 wherein a liquid acoustical coupling medium extends between said acoustic transducers and the said tubular member.

5. An ultrasonic testing apparatus in accordance with claim 3 wherein the time interval between successive energizing pulses applied to the transducers is sufficient to preclude any substantial interference of reflected acoustic energy from a previously applied energizing pulse.

6. An ultrasonic testing apparatus in accordance with claim 3 wherein each of said transducers is circumferentially disposed at a different angular position with reference to the axis of the member to be inspected.

7. In ultrasonic inspection apparatus suitable for examining the interior of a tubular member, the combination comprising
a first plurality of acoustic vibration transducers positioned substantially in a first plane perpendicular to the longitudinal axis of the tubular member being tested and spaced around said tubular member;
at least one second plurality of acoustic vibration transducers positioned substantially in a second plane perpendicular to the longitudinal axis of the tubular member being tested and spaced around said tubular member, there being sufficient transducers so spacer around said member and with respect to each other as to permit acoustic energy coverage circumferentially of said member substantially normally to its surface upon energization of all of said transducers;
electrical pulse generating means for so energizing said transducers sequentially, including alternating between transducers of said first plurality and transducers of said second plurality, that interference between the acoustic energy emanating from one transducer upon energization thereof and acoustic energy emanating from another transducer upon energization thereof is minimized; and
separate circuit means each connected to a different transducer and responsive only to electrical signals derived from reflections of acoustic energy previously transmitted from the connected transducer upon energization.

8. An ultrasonic testing apparatus in accordance with claim 7 wherein the time interval between successive energizing pulses applied to transducers in the same plane is sufficient to preclude any substantial interference from reflected acoustic energy caused by a previously applied energizing pulse.

9. An ultrasonic testing apparatus in accordance with claim 7 wherein said transducers are so circumferentially disposed that transducers in one plane are interposed with respect to transducers in the other plane to provide a complete inspection coverage circumferentially.

10. An ultrasonic inspection apparatus in accordance with claim 7 wherein a liquid acoustical coupling medium extends between said acoustic vibration transducers and the said tubular member.

11. In apparatus suitable for detecting flaws in a moving tubular member, the combination comprising
at least two pluralities of transducers, transducers in plurality being positioned susbstantially in a single plane perpendicular to the axis of the tubular member being tested and equidistant therefrom and being equally spaced around said tubular member,
each of said transducers being operative to transmit a pulse of acoustic energy into the tubular member toward the center of the tubular member and subsequently receive reflected acoustic energy pulses, said transducers being so spaced around said member and with respect to each other as to permit acoustic energy coverage circumferentially of said member upon energization of all of said transducers;
electrical pulse generating means for simultaneously energizing, in sequence, oppositely disposed pairs of transducers in the different pluralities, successively alternating among oppositely disposed pairs of transducers in the different pluralities, whereby interference between the acoustic energy emanating from one oppositely disposed pair of transducers upon energization thereof and acoustic energy emanating from another oppositely disposed pair of transducers upon energization thereof is minimized;
separate detection circuit means connected to each transducer and responsive to electrical pulses derived from reflections of acoustic energy previously transmitted from the connected transducer upon energization, there being received a separate pulse in time related to the distance from energized transducers and the member outer surface, member flaws, and member inner surface; and
means connected to each of said detection circuit means for indicating the presence of flaw pulses in the tubular member.

References Cited by the Examiner
UNITED STATES PATENTS

| | | | |
|---|---|---|---|
| 2,524,208 | 10/1950 | Piper | 73—67.6 |
| 2,700,895 | 2/1955 | Carson | 73—67.6 |
| 2,787,158 | 4/1957 | Valkenburg et al. | 73—67.5 |
| 2,848,890 | 8/1958 | Sheldon | 73—67.5 |
| 2,875,607 | 3/1959 | Boxcer et al. | 73—67.9 |
| 2,971,372 | 2/1961 | Lewis et al. | 73—67.5 |
| 3,021,706 | 2/1962 | Cook et al. | 73—67.8 |
| 3,052,115 | 9/1962 | Renaut et al. | 73—67.5 |

RICHARD C. QUEISSER, *Primary Examiner.*

JAMES J. GILL, *Examiner.*